United States Patent [19]
Duck

[11] Patent Number: 5,832,153
[45] Date of Patent: Nov. 3, 1998

[54] METHOD AND SYSTEM FOR REDUCING UNWANTED EFFECTS OF BACK REFLECTIONS BETWEEN TWO LENSES IN AN OPTICAL SYSTEM

[76] Inventor: Gary Stephen Duck, 6 Barcham Crescent, Nepean, Ontario, Canada, K2J 3Z7

[21] Appl. No.: 666,217

[22] Filed: Jun. 20, 1996

[51] Int. Cl.[6] .................................................... G02B 6/32
[52] U.S. Cl. ............................................................ 385/34
[58] Field of Search .................................. 385/33, 34, 74, 385/15–23, 47

[56] References Cited

U.S. PATENT DOCUMENTS

| | | | |
|---|---|---|---|
| 4,818,052 | 4/1989 | Le Pesant et al. ................... | 350/96.15 |
| 5,090,824 | 2/1992 | Nelson et al. ............................. | 385/22 |
| 5,276,747 | 1/1994 | Pan ............................................ | 385/34 |
| 5,546,180 | 8/1996 | Garel-Jones et al. ..................... | 385/22 |
| 5,557,692 | 9/1996 | Pan et al. .................................. | 385/16 |

*Primary Examiner*—John Ngo

[57] ABSTRACT

An optical system is provided for coupling light from one optical waveguide to another. By offsetting the parallel optical axes of two GRIN lenses by a minimum of 50 $\mu$m there is a significant reduction in unwanted effects from reflections. Furthermore etalon effects present in many optical coupling systems having parallel inwardly facing endfaces are reduced. The invention obviates the costly solution of for slanting one of the inwardly end-faces of the lens.

12 Claims, 3 Drawing Sheets

METHOD AND SYSTEM FOR REDUCING UNWANTED EFFECTS OF BACK REFLECTIONS BETWEEN TWO LENSES IN AN OPTICAL SYSTEM

FIELD OF THE INVENTION

This invention relates generally to optical coupling technology, and more particularly to a method and system for reducing unwanted effects normally associated with reflections between two GRaded INdex (GRIN) lenses in an optical system.

BACKGROUND OF THE INVENTION

As of late, one of the more ubiquitous building blocks used in the design and manufacture of optical elements is the GRaded INdex (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, isolators, and other devices. They are also used extensively as a means of coupling optical signals from one waveguide such as an optical fiber, to another, for example, in optical switches. Two quarter pitch GRIN lenses 2 and 4 disposed back-to-back are shown in prior art FIG. 1a providing a coupling system 5 wherein lens 2 collimates an incoming beam from a nearly point source emanating from an end-face of an optical fiber (not shown) at port 1 and the lens 4 serves to focus the received collimated beam to a nearly point source at port 3. Although the lenses are coated with an anti- reflection (AR) coating 7, the system 5 shown suffers from unwanted reflections due to imperfect coating. Furthermore, an unwanted etalon effect occurs between the parallel inwardly facing coated end-face surfaces 7 of the lenses.

Although this problem is known to effect digital systems, its consequences are even more significant in analog optical systems where stringent requirements exist for received signals to have minimal distortion or ripple. Thus, systems having back-to-back GRaded INdex lenses with parallel inwardly facing end-faces are known to suffer from etalon effects due to imperfect refractive index matching of adjacent elements resulting in a distorted output signal.

Attempts have made to lessen reflections and unwanted etalon effects. In FIG. 1b one solution is provided by offsetting the input port 6 and output port 8 on opposite sides of the optical axis. In this arrangement reflections are directed along an alternative path away from the source of the transmitting light at input port 6; the incident angle of the beam upon the coated, inwardly-facing end-face of the lens 4, ensures that any reflections will be directed backwards but on an opposite side of the optical axis of the lens 2 away from the port 6. Although such undertakings can reduce reflections, etalon effects are till present and thus, they are not considered by some, sufficient improvements. U.S. patent application entitled Optical Coupling Device in the name of Y. Calvin Si et al. assigned to JDS FITEL Inc., discloses an optical system 10 shown in FIG. 1c, having first and second lenses 12 and 14 wherein one of the lenses has an angled or wedge shaped end-face. This serves to reduce unwanted etalon effects, however, in some instances the solution is not ideal. Lenses are typically purchased in the symmetrical shape shown in FIG. 1a and are AR coated during fabrication. In order to obtain the slanted end-face shown in FIG. 1c, the GRIN lens 12 must be polished to obtain a desired angle and an AR coating is later applied; This reworking of the lens end-face greatly adds to the cost of manufacturing optical systems, for instance, switching systems.

The system in accordance to one aspect of this invention is particularly suited to low loss and low reflection coupling of optical signals within an optical switch. Various attempts have been made and methods suggested, in the design and manufacture of optical switches to efficiently couple light; some of these attempts have been better than others; however, it is believed that heretofore, none of the known methods have provided a system that is both inexpensive and efficient in the coupling of light.

It is therefore an object of this invention to provide a method for reducing unwanted effects of reflections between two lenses.

Furthermore, it is an object of this invention to attempt to provide a system in the form of a GRIN lens arrangement that achieves that end.

SUMMARY OF THE INVENTION

In accordance with the invention, an optical system is provided for coupling light from one optical waveguide to another comprising: a first and second graded index lens each having an outwardly facing end-face and an inwardly facing end-face, the outwardly facing end-faces of each of the lenses each being coupled off its optical axis to one of the waveguides, the graded index lenses being disposed in such a manner as to have their inwardly facing end-faces separated by a distance "d" which is approximately equal to 1 millimeter or more, and wherein the optical axes of the graded index lenses are substantially parallel to one another and offset by a distance "h" which is substantially enough of an offset as to prevent a beam of light reflected back from the second lens toward the first lens from substantially coupling into one of the waveguides on its return.

In accordance with the invention there is further provided, an optical system for coupling light from one optical waveguide to another comprising: two graded index lenses each having an outwardly facing end-face and an inwardly facing end-face, the outwardly facing end-faces of each of the lenses being coupled off its optical axis to one of the waveguides, the graded index lenses being disposed in such a manner as to have their inwardly facing end-faces separated by a distance "d", and wherein the optical axes of the graded index lenses are substantially parallel to one another and offset by a distance "h", values of "d" and "h" being selected such that "d" is substantially at least 1 mm, the value of "h" being a minimum of 50 $\mu$m.

In accordance with another aspect of the invention, there is provided, an optical light coupling system for switching light from a light input side to a light output side, the optical switching system comprising: on one of its sides a plurality of optical waveguides coupled to collimating graded index lenses, one graded index lens at one end of each of said plurality of optical waveguides, the lenses being located in spaced-apart predetermined positions around at least a concentric pitch circle; on the other of its sides at lease one optical waveguide having a light collimating lens at one end, the lens moveable with its end of the waveguide around an arc having a radius less than or greater than the radius of the concentric circle, the arc having a center that is coincident with the center of the pitch circle to locate the lens in any of a plurality of switch positions in each of which light is transferable between it and any one of the plurality of lenses, all of the lenses, having substantially parallel optical axes, the light being transferable along an axis that is non-parallel to the optical axes of the lenses.

In accordance with yet another aspect of the invention an optical coupling system with a light input side and a light output side for switching light from one side to another is provided, comprising: on one of its sides a plurality of optical waveguides coupled to light collimating graded index lenses, one graded index lens at one end of each of said plurality of optical waveguides, the graded index lenses being located in spaced-apart predetermined positions; on the other of its sides at least one optical waveguide having a graded index light collimating lens at one end, each optical waveguide and graded index lens being coupled such that the coupling location is off the optical axis of the lens, the graded index collimating lenses having parallel optical axes, the plurality of collimating lenses on one side being relatively movable with the other collimating lens on the other side into one of a plurality of light transmitting positions corresponding to a lens on each side being optically aligned with their optical axes are offset by a predetermined lateral distance of substantially at least 50 μm and inwardly facing end-faces as separated by at least 1 mm.

The invention provides numerous advantages over existing available methods and systems for coupling and switching light from one waveguide to another.

Advantageously, and in accordance with this invention a coupling is provided having:
a) low back reflection (LBR);
b) a lessening in unwanted etalon effect often present on many parallel optical interfaces:
c) a low cost; and,
c) minimal inside losses.

Advantageously this coupling can be used in a variety of optical switch applications.

BRIEF DESCRIPTION OF THE DRAWINGS

Exemplary embodiments of the invention will be described in conjunction with the drawings in which.

DETAILED DESCRIPTION

Figure 1A:
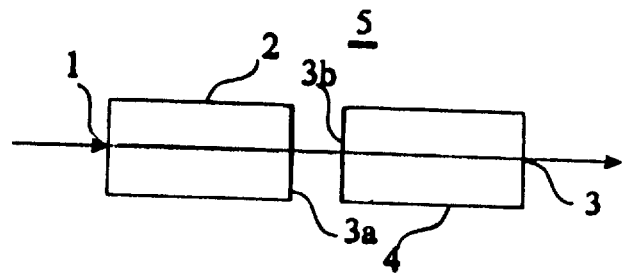
FIG. 1a is a side view of a pair of collimating GRIN lenses arranged to couple light from in input port on one to an output port on another of the lenses along a common optical axis of the lenses, in accordance with the prior art.
Figure 1B:
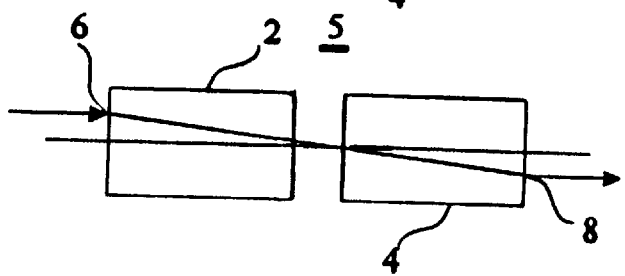
FIG. 1b is a side view of showing a similar arrangement of lenses as is shown in FIG. 1a, with input and output ports offset from the common optical axis of the lenses, in accordance with the prior art.
Figure 1C:
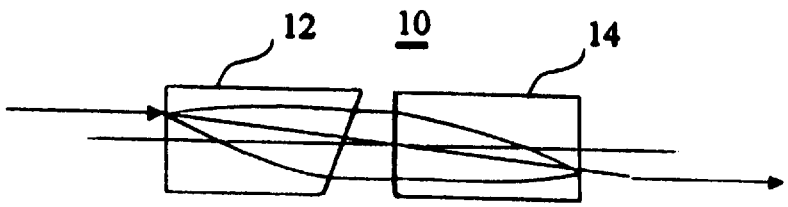
FIG. 1c is a side view of two collimating GRIN lenses, one of the lenses wherein one of the lenses has a slanted inwardly facing end-face, in accordance with the prior art.
Figure 1D:
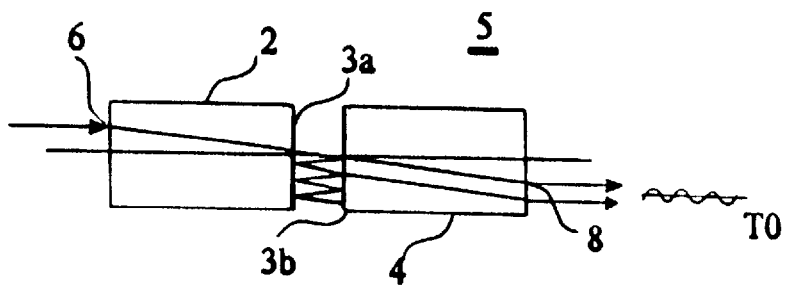
FIG. 1d is a side view of an interface between two lenses illustrating unwanted etalon effects that occur.

Turning to prior art FIG. 1b, an attempt is made to reduce the effects of back reflections by offsetting the input port from the optical axis. Although this scheme is of some benefit, the lensing system nevertheless suffers form etalon effects that are more clearly illustrated by viewing FIG. 1d. A Fabry Perot etalon is shown having parallel partially reflective partially transmissive surfaces 3a and 3b. Through an unwanted interference (etalon) effect, the output reflection signal R0 and more importantly the transmission signal T0 are distorted having an unwanted periodic ripple.

Figure 2:
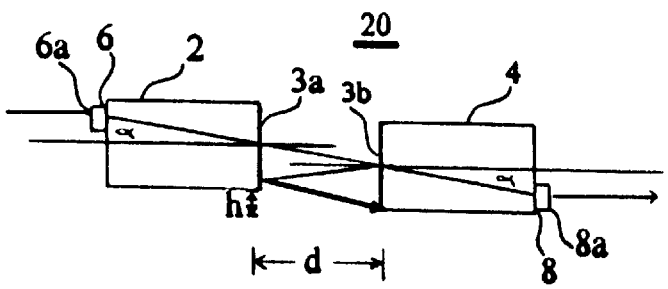
FIG. 2 is a side view of a pair of GRIN lenses similar to those shown in FIG. 1a, however shown spaced and oriented in accordance with the teachings and principles of this invention.

Referring now to FIG. 2, a first and second GRIN lenses 2 and 4 respectively, are disposed such that inwardly facing AR coated end-faces 3a and 3b are separated by a distance "d" which is preferably approximately 1 millimeter or greater. The optical axes (shown as dotted horizontal lines through the center of the lenses) are parallel to one another and separated by a lateral distance "h". The distance or height "h" is calculated such that a reflected beam of light along a zig-zag path shown does not substantially reflect back into the end-face 3b of the second lens 4. Spatially offsetting the lenses in this manner ensures that back reflections and etalon effects are minimized. Ensuring that the optical axes of the lenses are offset by a distance "h" ensures that light will be more efficiently coupled reducing light loss. The angle α at which light propagates through the lenses 2 and 4 is determined by how far the port 6 is off the optical axis. The angle α increases as the port is positioned further off or away from the optical axis. By increasing the angle, any reflected rays returning from the end-face 3b of the lens 4 are more likely to miss the end-face face 3a, or at least not traverse the optical axis of the lens 2 on the return path. The port 8 is disposed off the optical axis a same distance as port 6. Preferably, the substantially collimated light exiting the end-face 3a and entering the end face 3b is symmetrical about the optical axis of each respective lens.

This arrangement is particularly applicable in optical switching applications where one or more lenses can be selectably, optically aligned with one or more other lenses. The cost reduction in using the lens arrangement shown in FIG. 2, versus other solutions such as that shown in FIG. 1c, can be significant. Furthermore, both the effects of unwanted back reflections and etalon effects are reduced.

Figure 3:
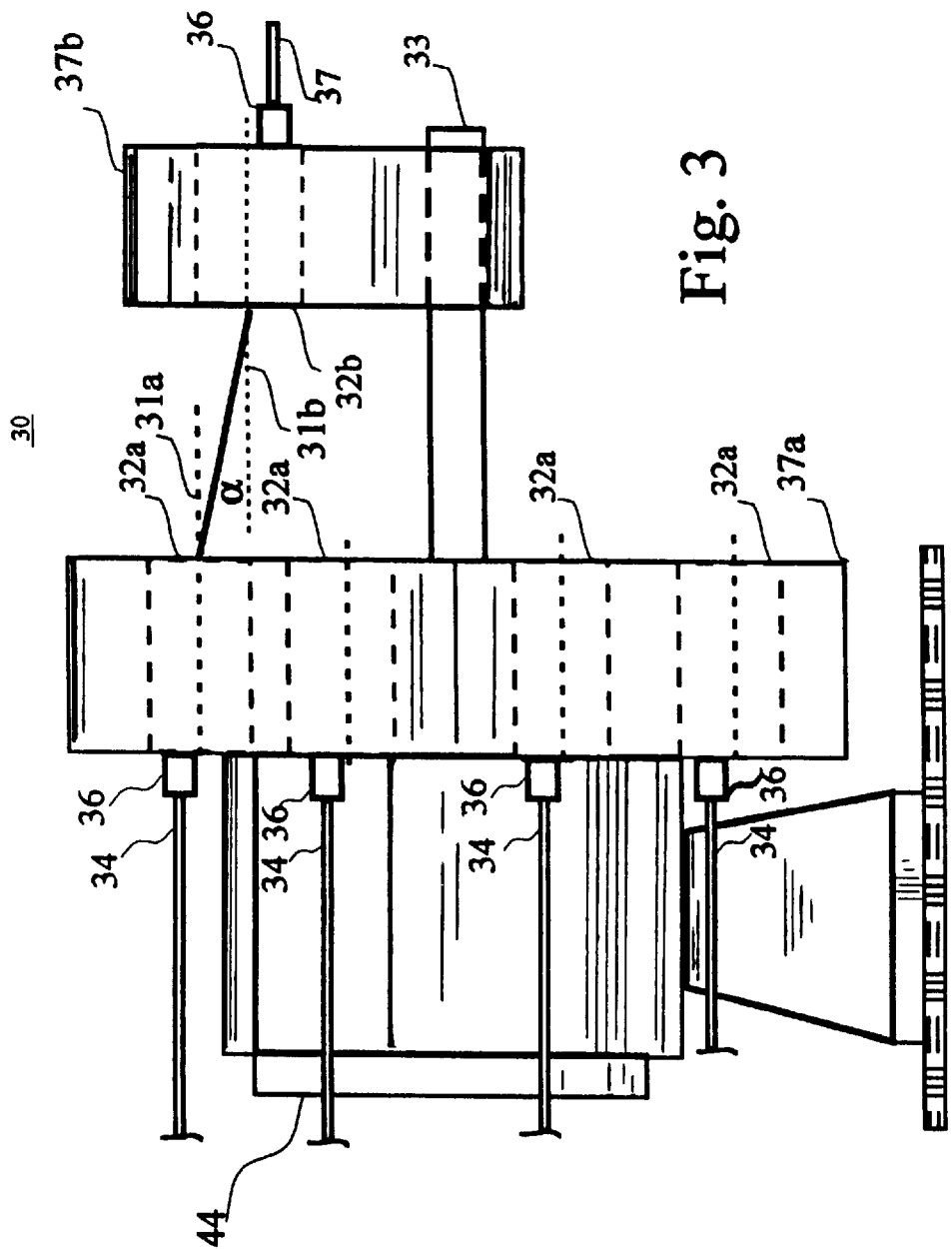
FIG. 3 is a side view of an optical switch having a plurality of pairs of GRIN lenses switchable to be spaced and oriented in a manner similar to that shown in FIG. 2; and, FIG. 4 is a plan view of a different optical switch having a plurality of GRIN lenses switchable to be spaced and oriented in a manner similar to that shown in FIG. 2.

In FIG. 3 an embodiment optical coupling system in the form of an optical switch 30 in accordance with the present invention is shown comprising a light input side in which it comprises a single optical waveguide 37 terminating at one end in a collimating lens 32 coupled to the lens by a coupling tube 36. The lens is a one quarter pitch Grin lens although collimating lenses of other pitches could be used. The lens provides a parallel sided light beam which in this case is about 300 μm in diameter, derived from a 10 μm core diameter of the waveguide. The lens is also anti-reflection coated at one end for low light loss. The description of this embodiment thus far is similar to one in U.S. Pat. No. 4,378,144 entitled "Optical Switch" in the name of the same inventor Gary Duck. However, the position of optically aligned lenses in this embodiment differs greatly from that of the prior art.

On a light output side the switch comprises a plurality of optical waveguides 34. The actual number is dependent upon the requirements in this embodiment 99 waveguides are provided, (4 only, shown in FIG. 3 for clarity). Each waveguide is provided with a collimating GRIN lens 32a at one end. These lenses form a group and are located in spaced apart predetermined positions upon a pitch circle by securing the lenses through holes in a face-plate 37a. The single lens 32b is fixed in the hole of an arm 37b that is secured to a rotatable shaft 33 passing through the face-plate with its rotational axis coincident with the pitch circle of the group of lenses 32a.

The switch 30 has 99 positions, one for each lens 32a. In each switching position, the lens 32b is optically but not axially aligned with a lens 32a so as to enable it to transfer light directly to the lens 16 as a collimated beam about 1 millimeter in diameter. Since the input fiber 37 is coupled to the lens off the optical axis of the lens 32b, the beam exits the lens 32b at an angle α as is shown. The angle must be sufficient to direct the beam into a lens 32a that whose optical axis is offset (see FIG. 2) from the optical axis of the lens 32b. Furthermore, the angle must be sufficient to lessen the effects of back reflections at the input fiber 37 and to lessen or obviate etalon effects. The arm is thus rotatable to move the lens from one switching position to another around the arc of a circle of a larger or smaller radius than the concentric pitch circle of the lenses 32a. The operating clearance between the lenses must be sufficient to both allow movement unimpeded movement during switching as well as efficient coupling of light. Of course, geometry is such, that as the space or clearance between the lenses increases, the required angle α(and offset of the optical fiber from the optical axis) decreases. Means is provided in the form of an electric stepping motor 44 and control circuitry (not shown) to move the arm 37b into a plurality of selectable positions.

Figure 4:
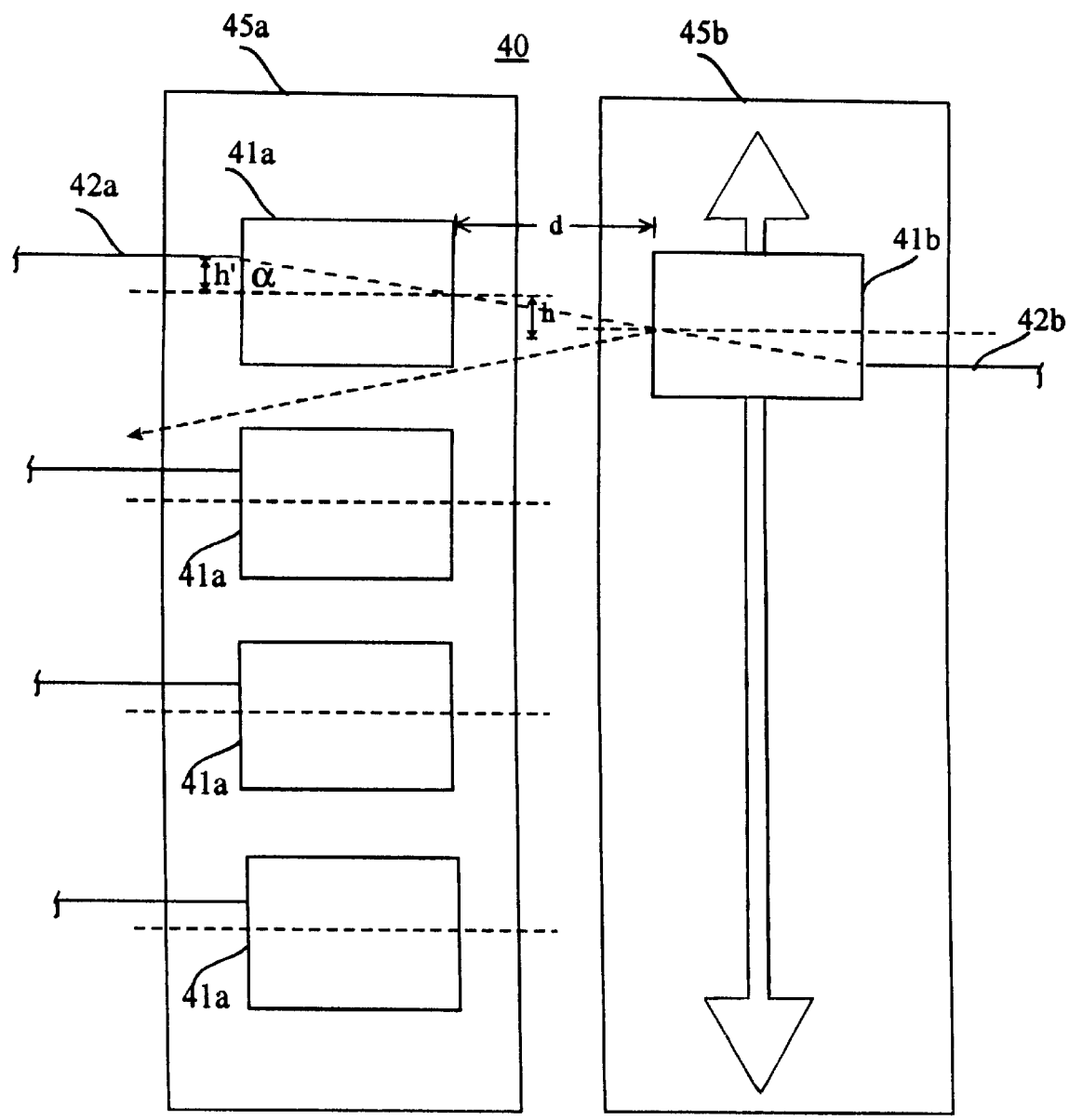

Turning now to a switch 40 in another embodiment of the invention, a plurality of GRIN lenses 41a mounted to a stage 45a are shown spaced from one another and having parallel optical axes. An optical fiber 42a is coupled to a first lens 41a such that the fiber is offset from the optical axis of the lens. The offset is determined in accordance with a desired transmitting angle ax through the lens (shown in dotted outline as an extension from the input optical fiber 42a). As the design of the switch requires the offset from the optical axis to be increased, the angle α increases. On another side of the switch 40 a single GRIN lens 41b is slidabley mounted to a stage 45b. The lens 41b is capable of controlled linear stepwise movement (along the path defined by the heavy double arrowed line shown). An optical fiber 42b is coupled to a face of the lens 41b and offset from the optical axis by a same distance as is optical fiber 42a on lens 41a. The dotted line (angled by α degrees with respect to the optical axis of the lens 41a) originating at the optical fiber end 42a illustrates the direction of propagation of a ray of light that is a center of a collimated beam between the two inwardly facing end-faces when light is transmitted through the switch. Although "h", the offset between optical axes of optically aligned lenses can be varied, the distance "d" can also be varied and the offset "h" can be varied as well; it is preferred however that a geometry be maintained whereby a straight line exists from one fiber 42a end to another fiber 42b end, wherein the line 25 traverses the optical axes at the end-faces of the lenses as is shown in the optically aligned lenses of FIG. 4. Essentially a center of a beam traversing a lens should exit symmetrically about the optical axis. Various means for moving the lens 41b precisely to predetermined locations for alignment with one of the lenses 41a may be envisaged by those skilled in the art.

Of course numerous other embodiments may also be envisaged without departing from the spirit and scope of this invention.

What we claim is:

1. An optical system for coupling light exclusively between two optical waveguides comprising: a first and second graded index lens each optically coupled to one of the two waveguides, each graded index lenses having an outwardly facing end-face and an inwardly facing end-face, the outwardly facing end-faces of each of the lenses each being coupled off its optical axis to one of the waveguides, the graded index lenses being disposed in such a manner as to have their inwardly facing end-faces separated by a distance "d" which is approximately equal to 1 millimeter or more, and wherein the optical axes of the graded index lenses are substantially parallel to one another and offset by a distance "h" which is substantially enough of an offset as to prevent a beam of light reflected back from the second lens toward the first lens from substantially coupling into one of the waveguides on its, wherein when a beam of light is launched into the one of the two waveguides destined for the other of the two waveguides, substantially the entire beam follows a single path in a direction from one of the inwardly facing end faces of one graded index lens to the other inwardly facing end face of the other graded index lens.

2. An optical system as defined in claim 1, wherein the path followed by the beam is a substantially straight path offset from the optical axes of the graded index lenses and wherein the values of "d" and "h" are such that substantially most of any light reflecting backward from the second lens toward the first lens substantially misses the second lens on its return from the first lens, and wherein each optical waveguide and graded index lens end face coupled therewith is coupled in such a manner as to be coupled off the optical axes of the respective lens.

3. An optical device as defined in claim 1 wherein the distance "d" is less than the sum of the lengths of the two graded index lenses.

4. An optical system for coupling light exclusively between two optical waveguides comprising: two graded index lenses each having an outwardly facing end-face and an inwardly facing end-face, the outwardly facing end-faces of each of the lenses being coupled off its optical axis to one of the waveguides, the graded index lenses being disposed in such a manner as to have their inwardly facing end-faces separated by a distance "d", and wherein the optical axes of the graded index lenses are substantially parallel to one another and offset by a distance "h", values of "d" and "h" being selected such that "d" is substantially at least 1 mm, the value of h being a minimum of 50 μm, the two graded index lenses being disposed such that when a beam of light is launched into the one of the two waveguides destined for the other of the two waveguides, substantially the entire beam follows a single path in a direction from one of the inwardly facing end faces of one graded index lens to the other inwardly facing end face of the other graded index lens, and wherein when the beam propagating between the two graded index lenses follows a path that is non-parallel to the optical axes of the graded index lenses.

5. An optical device as defined in claim 4 wherein the distance "d" is less than the sum of the lengths of the two graded index lenses.

6. An optical light coupling system for switching light from a light input side to a light output side, the optical switching system comprising:

on one of its sides a plurality of optical waveguides coupled to light collimating graded index lenses, one graded index lens at one each of each of said plurality of optical waveguides, the lenses being located in spaced-apart predetermined positions around at least a concentric pitch circle; on the other of its sides at least one optical waveguide having a light collimating lens at one end, the lens moveable with its end of the waveguide around an arc having a radius less than or greater than the radius of the concentric circle, the arc having a center that is coincident with the center of the pitch circle to locate the lens in any of a plurality of switch positions in each of which light is transferable between it and any one of the plurality of lenses, all of the lenses, having substantially parallel optical axes, the light being transferable along an axis that is non-parallel to the optical axes of the lenses, such that when light is launched into one of the optical waveguides on one side destined for another of the optical waveguides on the other side, the light exclusively follows a single substantially straight path from one graded index lens to a single other graded index lens without being separated into other paths between the graded index lenses.

7. An optical light coupling system for switching as defined in claim 6, wherein a distance between the radius of the arc and the radius of the pitch circle is 50 μm or greater.

8. An optical coupling system as defined in claim 6, wherein a space between two optically aligned graded index lenses is less than the distance of the sum of the lengths of the graded index lenses.

9. An optical coupling system with a light input side and a light output side for switching light from one side to another, comprising:

on one of its sides a plurality of optical waveguides coupled to light collimating graded index lenses, one graded index lens at one end of each of said plurality of optical waveguides, the graded index lenses being located in spaced-apart predetermined positions;

on the other of its sides at least one optical waveguide having a graded index light collimating lens at one end, each optical waveguide and graded index lens being coupled such that the coupling location is off the optical axis of the lens, the graded index collimating lenses having parallel optical axes, the plurality of collimating lenses on one side being relatively movable with the other collimating lens on the other side into one of a plurality of light transmitting positions corresponding to a lens on each side being optically aligned with their optical axes are offset by a predetermined lateral distance of substantially at least 50 μm and inwardly facing end-faces as separated by at least 1 mm, wherein when a first lens a collimating lens on one side is optically aligned with a second second lens on the other side, light launched into the first lens is exclusively coupled with the second lens.

10. An optical coupling system as defined in claim 9, wherein a space between two optically aligned graded index lenses is less than the distance of the sum of the lengths of the graded index lenses.

11. An optical system for coupling light from one optical waveguide to another consisting of: a first and second graded index lens each having an outwardly facing end-face and an inwardly facing end-face, the outwardly facing end-faces of each of the lenses each being coupled off its optical axis to one of the waveguides, the graded index lenses being disposed in such a manner as to have their inwardly facing end-faces separated by a distance "d" which is approximately equal to 1 millimeter or more, and wherein the optical axes of the graded index lenses are substantially parallel to one another and offset by a distance "h" which is substantially enough of an offset as to prevent a beam of light reflected back from the second lens toward the first lens from substantially coupling into one of the waveguides on its return.

12. An optical coupling system with a light input side and a light output side for switching light from one side to another, consisting of:

on one of its sides a plurality of optical waveguides coupled to light collimating graded index lenses, one graded index lens at one end of each of said plurality of optical waveguides, the graded index lenses being located in spaced-apart predetermined positions;

on the other of its sides at least one optical waveguide having a graded index light collimating lens at one end, each optical waveguide and graded index lens being coupled such that the coupling location is off the optical axis of the lens, the graded index collimating lenses having parallel optical axes, the plurality of collimating lenses on one side being relatively movable with the other collimating lens on the other side into one of a plurality of light transmitting positions corresponding to a lens on each side being optically aligned with their optical axes are offset by a predetermined lateral distance of substantially at least 50 μm and inwardly facing end-faces as separated by at least 1 mm.

* * * * *